United States Patent [19]

Nakagawa et al.

[11] Patent Number: 5,131,447
[45] Date of Patent: Jul. 21, 1992

[54] PNEUMATIC RADIAL TIRE

[75] Inventors: Hidemitsu Nakagawa, Tokyo; Hiroyuki Koseki, Kodaira, both of Japan

[73] Assignee: Bridgestone Corporation, Tokyo, Japan

[21] Appl. No.: 493,761

[22] Filed: Mar. 15, 1990

[30] Foreign Application Priority Data

Apr. 19, 1989 [JP] Japan .................................. 1-99194

[51] Int. Cl.⁵ .............................................. B60C 15/06
[52] U.S. Cl. .................................. 152/543; 152/546; 152/547
[58] Field of Search ............... 152/539, 541, 543, 546, 152/552, 554

[56] References Cited

U.S. PATENT DOCUMENTS

| | | |
|---|---|---|
| 3,921,693 | 11/1975 | Suzuki et al. |
| 4,046,183 | 9/1977 | Takahashi et al. |
| 4,941,523 | 7/1990 | Galante et al. ..................... 152/543 |
| 4,953,605 | 9/1990 | Kawamura et al. ................ 152/547 |

FOREIGN PATENT DOCUMENTS

| | | |
|---|---|---|
| 0251145 | 1/1988 | European Pat. Off. |
| 0118510 | 7/1984 | Japan .................................. 152/539 |
| 61-193904 | 8/1986 | Japan . |
| 2000732 | 1/1979 | United Kingdom . |
| 2150894 | 7/1985 | United Kingdom . |

Primary Examiner—Michael W. Ball
Assistant Examiner—Nancy T. Krawczyk
Attorney, Agent, or Firm—Oliff & Berridge

[57] ABSTRACT

A pneumatic radial tire having at least one carcass ply, distal ends of which are folded back axially outwardly about a pair of bead cores to form respective turn-up portions. A hard rubber sheet is disposed on the outer side of each turn-up portion in such a manner as to partially overlap with the same in a mutually space-apart relationship, and a soft rubber material which is softer than the hard rubber sheet is interposed between the turn-up portion and the hard rubber sheet, thereby reducing the amount of stress and heat ocurring in the vicinity of the end portions of the turn-up portions of the carcass ply.

15 Claims, 14 Drawing Sheets

PNEUMATIC RADIAL TIRE

BACKGROUND OF THE INVENTION

The present invention relates to radial tires for use on trucks, buses and the like, and more particularly to pneumatic radial tires with consideration given to improved durability of bead portions thereof.

In a pneumatic radial tire having one or more carcass plies, particularly in a tire used under heavy loads after renewing the tread several times, cracks are likely to occur in the vicinity of an end face of a turn-up portion of the carcass owing to a lack of rigidity of a bead portion, thereby presenting a problem.

Therefore, in order to overcome this lack of rigidity of the bead portion, bead portion structures such as those shown in FIGS. 6a, 6b, and 6c are generally adopted. In the figures, reference numeral 11 denotes a rim of a road wheel. A carcass 10 is composed of one ply or a small number of plies (one ply is shown in the figures) whose carcass ply cords extend in a direction substantially perpendicular to the equatorial plane of the tire, a turn-up portion 10A of the carcass 10 being formed by folding back an end portion of the carcass 10 around a bead core 12 from the inside of the tire towards the outside thereof.

A strip of rubberized steel cords 14 and/or strips of rubberized textile cords 16, 18, 20 respectively serving as bead portion reinforcing layers are disposed singly or in a combination in the vicinity of the bead core 12 on the side of the carcass 10 further away from the side where the bead core 12 is provided.

In the situation where a plurality of bead portion reinforcing layers are used, the more axially outwardly a radial outward end (upper end in the figures) of the bead portion reinforcing layer on the turn-up portion 10A side of the carcass 10 is situated, the more radially outward the end of that bead portion reinforcing layer is situated. It should be noted that the terms "axial" or "axially" used herein and in the appended claims refer to directions which are parallel to the axis of rotation of the tire, while the terms "radial" and "radially" refer to directions that are perpendicular to the axis of rotation of the tire. A lower end 16A of the strip of rubberized textile cords 16 terminates in the vicinity of the bead core 12, but the strip of rubberized steel cords 14 and the strips of rubberized textile cords 18, 20 extend further along the carcass 10 up to its body portion 10B.

A stiffener 21 is interposed between the body portion 10B of the carcass 10 and the turn-up portion 10A thereof. This stiffener 21 has a substantially triangular radial cross-section and comprises a hard stiffener 22 disposed in the vicinity of the bead core 12 and a soft stiffener 24 adjacent to the hard stiffener 22. A radially outer edge of the stiffener 21 is located more radially upward than the radially outer edge of the strip of rubberized steel cords 14, or the strip of rubberized textile cords 16, 18, or 20.

With this bead portion structure, the rigidity of the overall bead portion is enhanced by virtue of the reinforcing layers, so that the deformation of a rubber portion 32 in the vicinity of the distal end portion of the carcass 10 is suppressed at the time when the tire rotates under a load.

As a result, the distal end portion of the turn-up portion 10A is less likely to exfoliate from the rubber portion 32.

With such a conventional structure, however, if the reinforcing layer (or layers) is strengthened in order to increase the rigidity of the overall bead portion, the end portion of the reinforcing layer becomes a new source of concentration of strain. Hence, the occurrence of cracks originating from the end portion of the reinforcing layer presents a new issue, so that it has not been possible to sufficiently improve the durability of the bead portion.

SUMMARY OF THE INVENTION

Accordingly, an object of the present invention is to provide a pneumatic radial tire in which the amount of heat and strain generated in the vicinity of distal end portions of a carcass can be reduced and the durability of bead portions can be improved without any occurrence of new cracks therein.

To this end, in accordance with one aspect of the present invention, there is provided a pneumatic radial tire having at least one carcass ply which is formed of carcass ply cords and carcass ply coating rubber covering longitudinal peripheral surfaces thereof, distal end portions of which are respectively folded back around bead cores from the inside of the tire to the outside thereof to constitute turn-up portions. The pneumatic radial tire is inflated with air and comprises a hard rubber sheet including an opposing portion which opposes an axially outer side of the turn-up portion, and a projecting portion which projects radially outwardly of an end face of the turn-up portion in a direction away from the bead core; and a soft rubber material which is interposed between the turn-up portion and the hard rubber sheet and is softer than the hard rubber sheet.

In accordance with another aspect of the present invention, there is provided a pneumatic radial tire having at least one carcass ply which is formed of carcass ply cords and carcass ply coating rubber covering longitudinal peripheral surfaces thereof, distal end portions of which are respectively folded back around bead cores from the inside of the tire to the outside thereof to constitute turn-up portions. The pneumatic radial tire is inflated with air and comprises a stiffener disposed in such a manner as to extend from an inside portion of the turn-up portion of the carcass ply radially outwardly thereof; a hard rubber sheet including an opposing portion which opposes an axially outer side of the turn-up portion, and a projecting portion which projects radially outwardly of an end face of the turn-up portion in a direction away from the bead core; a soft rubber material which is interposed between the turn-up portion and the hard rubber sheet and which is softer than the hard rubber sheet; and surface layer rubber disposed on the outer side of the hard rubber sheet.

In a conventional structure, since a large difference exists between the rigidity of carcass ply cords and the rigidity of the rubber portion in the vicinity of the distal end of the turn-up portion of the carcass, a large concentration of stress occurs in the rubber portion in the vicinity of the distal end of the turn-up portion of the carcass, resulting in the occurrence of strain and heat.

In accordance with the present invention, a structure is provided for reducing the sharp difference in rigidity in the vicinity of the distal end of the turn-up portion of the carcass by focusing attention on the mechanism of generation of the strain and heat.

In other words, the hard rubber sheet is disposed on the axially outer side of the distal end portion of the turn-up portion of the carcass in a partly overlapping manner so as to extend beyond an end face of the turn-up portion of the carcass and thereby reduce the sharp difference in rigidity in the vicinity of the distal end of the turn-up portion of the carcass. Thus, by providing for a gradual reduction in rigidity, the concentration of stress is substantially eliminated and the strain is reduced. In addition, since reinforcement by means of the hard rubber sheet is less liable to constitute a heat generating source than reinforcement using steel or other similar cords, the heat generation characteristics of the bead portion during rotation of the tire are improved. Furthermore, since the hard rubber sheet has a low modulus of elasticity as compared with that of cords, concentration of stress at the end of the hard rubber sheet is small, so that the hard rubber sheet is unlikely to become a new source of occurrence of cracks.

As for the range in which the hard rubber sheet is disposed, if the hard rubber sheet projects radially outwardly by an excessive amount beyond the end face of the turn-up portion of the carcass, into a nucleus of breakage region, then the hard rubber sheet would be situated at a side portion of the tire which is subjected to a large degree of bending. In that case, cracks are liable to occur at an upper end of the hard rubber sheet. For this reason it is preferable that the hard rubber sheet projects radially outwardly from a line parallel to the tire's axis of rotation and containing a radially outermost point of the end face of the carcass no more than 0.16 times the radial cross.sectional height of the carcass ply.

The greater the tensile strength of the hard rubber sheet, the more the concentration of the stress in the distal end portion of the turn-up portion is alleviated. However, if the tensile strength of the hard rubber sheet is excessively large, the upper end of the hard rubber sheet becomes a new source of stress concentration, leading to the occurrence of cracks. Accordingly, the tensile strength of the hard rubber sheet should preferably be in a range such that the modulus of elasticity of the hard rubber sheet does not exceed 70 kgf/cm$^2$ at a 20% elongation.

The smaller the dimension between the hard rubber sheet and the carcass ply cord, the greater the effect of alleviating the concentration of stress at the end face of the turn-up portion of the carcass. However, if the dimension is too small, the shear deformation of the rubber between the hard rubber sheet and the carcass ply cords increases sharply, so that cracks are liable to occur. Accordingly, it is necessary that the dimension between the hard rubber sheet and the carcass ply cords be not less than the diameter of the carcass ply cord and not more than 10 times the diameter of the carcass ply cord.

The thickness of the hard rubber sheet is set to be not less than the diameter of the carcass ply cord, and surface-layer rubber is disposed axially outwardly of the hard rubber sheet as a necessary means of preventing deterioration in weather resistance which could result if the hard rubber sheet is exposed to the outer surface of the tire.

The above and other objects, features and advantages of the present invention will become more apparent from the following detailed description of the invention when taken in conjunction with the accompanying drawings.

DESCRIPTION OF THE PREFERRED EMBODIMENTS

Figure 1A:
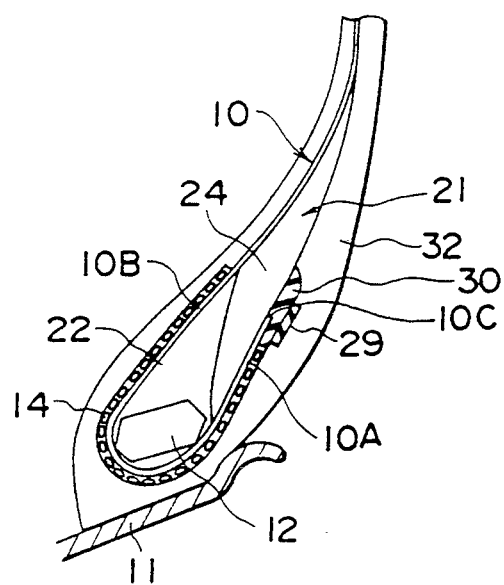
FIGS. 1a to 1d are cross.sectional views of tire bead portions in accordance with the embodiments of the present invention, respectively illustrating the relationship between a bead core, a carcass, a hard rubber sheet, soft rubber, and a reinforcing layer or layers.
Figure 1:
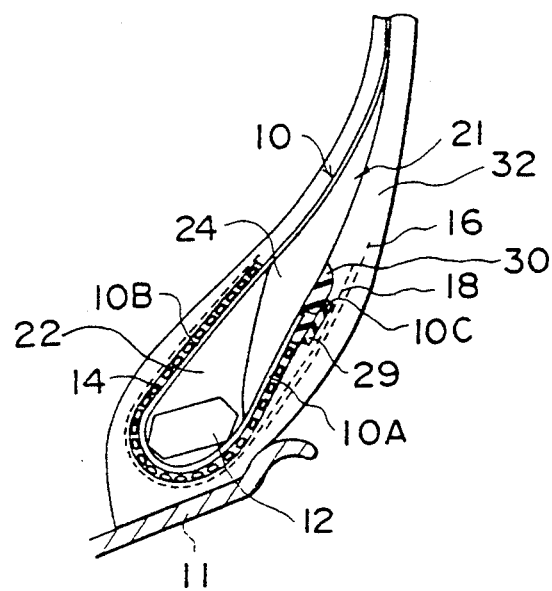
Figure 2:
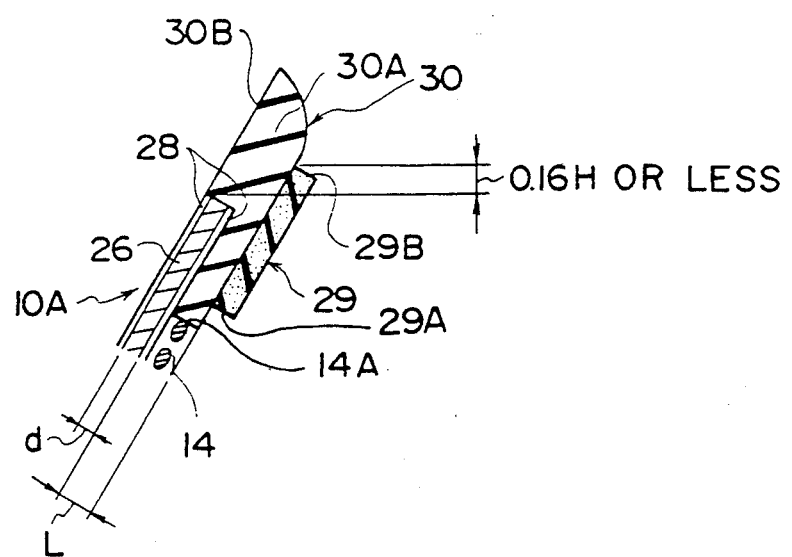
FIGS. 2a to 2d are partial enlarged views of portions of FIGS. 1a to 1d, respectively.
Figure 2:
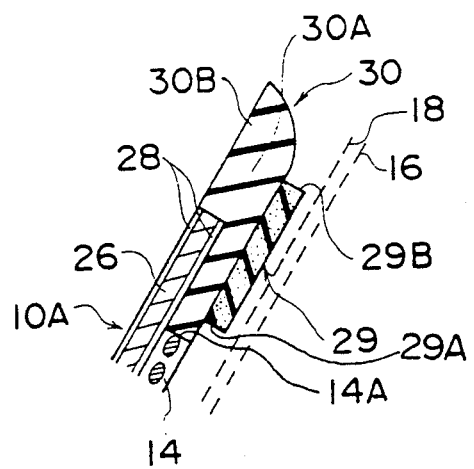
Figure 2:
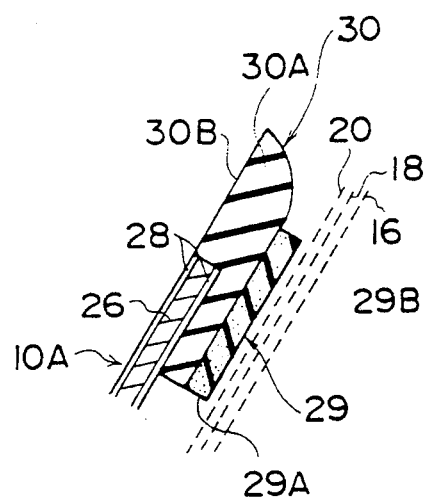
Figure 2:
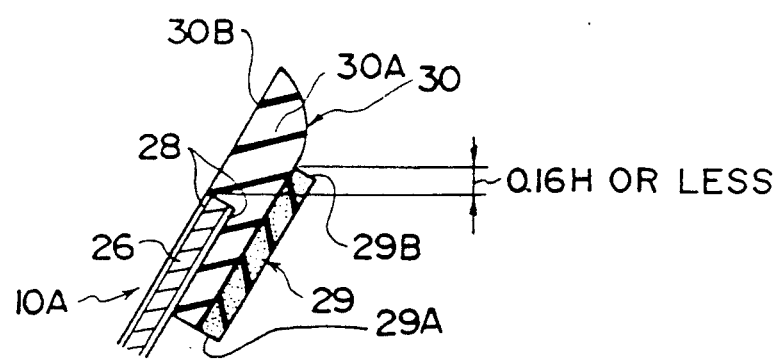
Figure 6A:
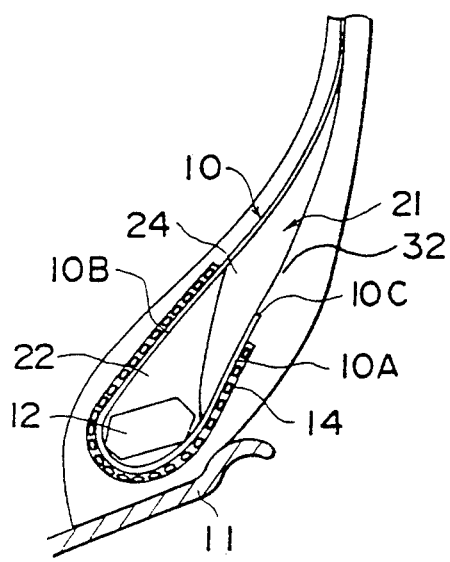
FIGS. 6a to 6c are partial cross.sectional views of conventional tires.
Figure 6:
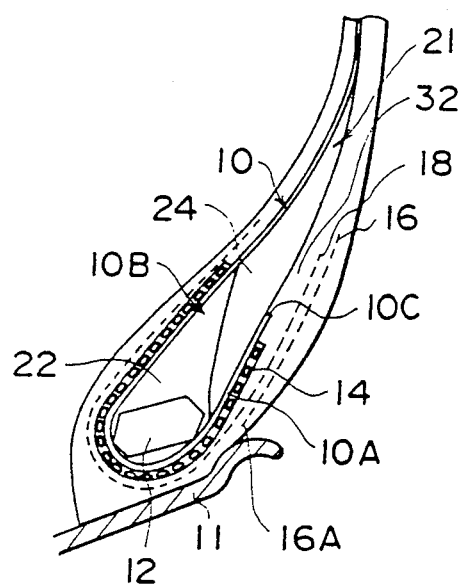
Figure 6:
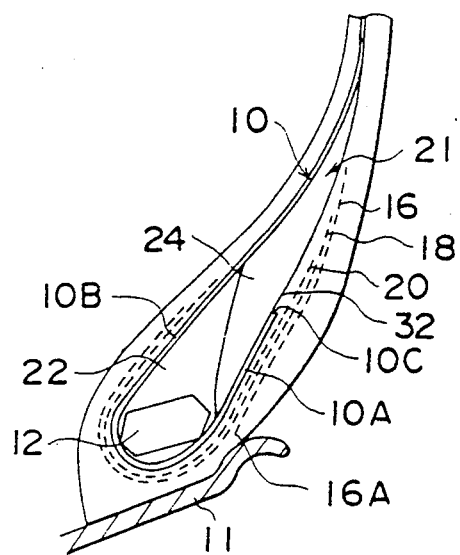

In the bead portion structures shown in FIGS. 1a and 2b, a carcass 10, a strip of rubberized steel cords 14, and a stiffener 21 are arranged in the same way as those of a conventional example described in relation to FIG. 6a. As shown in FIG. 2a, outer peripheral surfaces of carcass ply cords 26 are coated with ply coating rubber 28. In addition, a hard rubber sheet 29 is disposed on the axially outward side (right.hand side in FIGS. 1 and 2) of an end portion of a turn-up portion of the carcass 10.

A radially inner end 29A of the hard rubber sheet 29 is spaced apart from and radially outward of the axially outer side of a radially outer end 14A of the strip of rubberized steel cords 14 by not less than a diameter d of the carcass ply cord 26. Meanwhile, a radially outer end 29B of the hard rubber sheet 29 extends beyond an end face 10C of the turn-up portion 10A of the carcass 10.

In addition, soft rubber 30 is filled into a portion surrounded by the turn-up portion 10A of the carcass 10, the hard rubber sheet 29, and the strip of rubberized steel cords 14. A radially outer end portion 30A of this soft rubber 30 covers the end face 10C of the turn-up portion 10A of the carcass 10, and an axially inner side 30B of the radially outer end portion 30A is connected to the stiffener 21.

That is, the hard rubber sheet 29 is disposed on the axially outer side of the distal end portion of the turn-up portion 10A in such a manner as to extend beyond the end face 10C of the carcass 10 in a partly overlapping manner. This arrangement makes it possible to reduce a sharp difference between the rigidity of the carcass ply cords 26 and that of the soft rubber 30 in the vicinity of the end face 10C of the carcass, thereby eliminating the occurrence of a local concentration of stress. In addition, in a case where reinforcement is provided by means of the hard rubber sheet 29, the hard rubber sheet 29 is unlikely to become a source of heat as compared with a case where the carcass ply cords are reinforced directly by the strip of rubberized steel cords 14 or the like, so that the heat generating characteristics of the bead portion during rotation of the tire can be improved.

Figure 5:
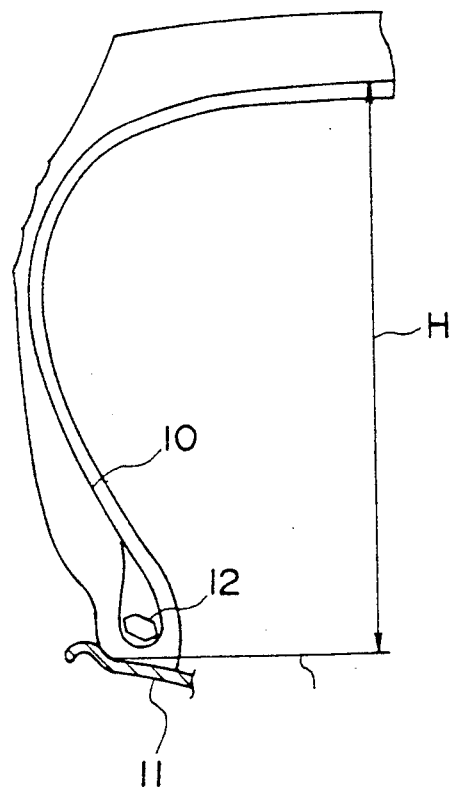
FIG. 5 is a schematic diagram illustrating a radial cross.sectional height H of a carcass layer.

As for the range in which the hard rubber sheet 29 is disposed, if the upper end of the hard rubber sheet 29 projects radially outwardly by an excessive amount beyond the end face 10C of the carcass, the hard rubber sheet 29 will be situated in a side portion of the tire which is subjected to a large degree of bending, with the result that a crack is liable to occur at an upper end 29B of the hard rubber sheet 29. For this reason, if a radial cross-sectional height of the carcass layer (see FIG. 5) is assumed to be H, the amount that the projecting portion of the hard rubber sheet 29 projects radially outwardly of a line parallel to the tire's axis of rotation and containing a radially outermost point of the end face 10C of the carcass is preferably not more than 0.16 H.

The greater the tensile strength of the hard rubber sheet 29, the more the concentration of the stress in the distal end portion of the turn-up portion 10A is alleviated. However, if the tensile strength of the hard rubber sheet 29 is excessively large, the upper end 29B of the hard rubber sheet 29 becomes a new source of stress concentration, leading to the occurrence of cracks. Accordingly, the tensile strength of the hard rubber sheet 29 is preferably set in a range such that the modulus of elasticity of the hard rubber sheet 29 does not exceed 70 kgf/cm$^2$ at a 20% elongation.

The smaller the dimension L between the hard rubber sheet 29 and the carcass ply cord 26, the greater the effect of alleviating the concentration of stress at the end face 10C of the carcass. However, if the dimension L is too small, an amount of shear deformation of the rubber 30 between the hard rubber sheet 29 and the carcass 10 increases sharply, so that cracks are liable to occur. Accordingly, it is necessary that the dimension L between the hard rubber sheet 29 and the carcass ply cord 26 be not less than the diameter d of the carcass ply cord 26 and not more than ten times d.

The modulus of elasticity of the soft rubber 30 at a 20% elongation is not more than three-fourths of the modulus of elasticity of the hard rubber sheet 29 at a 20% elongation. The tensile strength of the soft rubber 30 may be identical with that of the ply coating rubber 28.

The thickness of the hard rubber sheet 29 is set to be not less than the diameter d of the carcass ply cord 26, and a surface-layer rubber 32 is disposed axially outwardly of the hard rubber sheet 29 as a necessary means of preventing deterioration in weather resistance which could result if the hard rubber sheet 29 is exposed to the outer surface of the tire. The surface-layer rubber 32 is formed of a rubber material having a modulus of elasticity of 7.89 kgf/cm$^2$ at a 25% elongation.

In the bead portion structure shown in FIGS. 1b and 2b, the carcass 10, the strip of rubberized steel cords 14, the strips of rubberized textile cords 16, 18, and the stiffener 21 are arranged in the same way as those of the conventional example described in relation to FIG. 6b. In addition, the hard rubber sheet 29 is disposed between the axially outer side of the distal end portion of the turn-up portion 10A of the carcass and the strip of rubberized textile cords 18, in the same way as in FIGS. 1a and 2a.

Figure 1C:
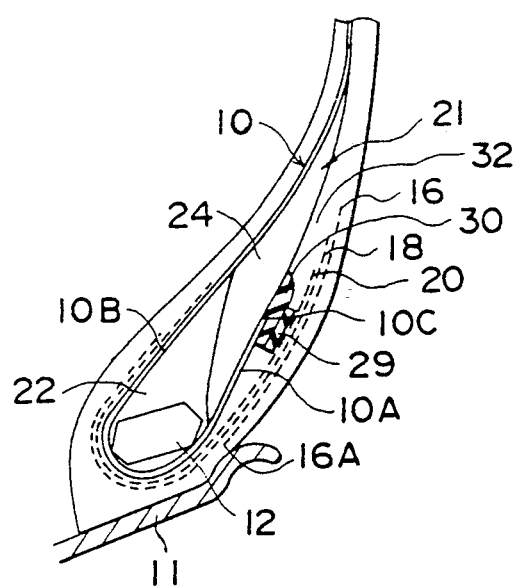

In the bead portion structure shown in FIGS. 1c and 2c, the carcass 10, the strips of rubberized textile cords 16, 18, and the stiffener 21 are arranged in the same way as those of the conventional example described in relation to FIG. 6c. However in addition, the hard rubber sheet 29 is disposed between the axially outer side of the distal portion of the turn-up portion 10A of the carcass 10 and the strip of rubberized textile cords 20.

The hard rubber sheet 29 has an arrangement similar to that shown in FIGS. 1a and 2a.

Figure 1D:
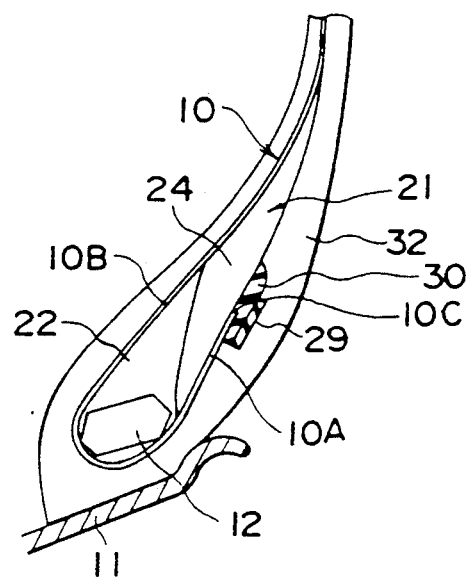

Although in the foregoing embodiments a description has been given of pneumatic radial tires having a bead reinforcing layer or layers, it is possible to obtain similar effects if the hard rubber sheet 29 is provided in a radial tire which is not provided with a bead reinforcing layer, as shown in FIGS. 1d and 2d.

EXPERIMENT 1

Figure 3:
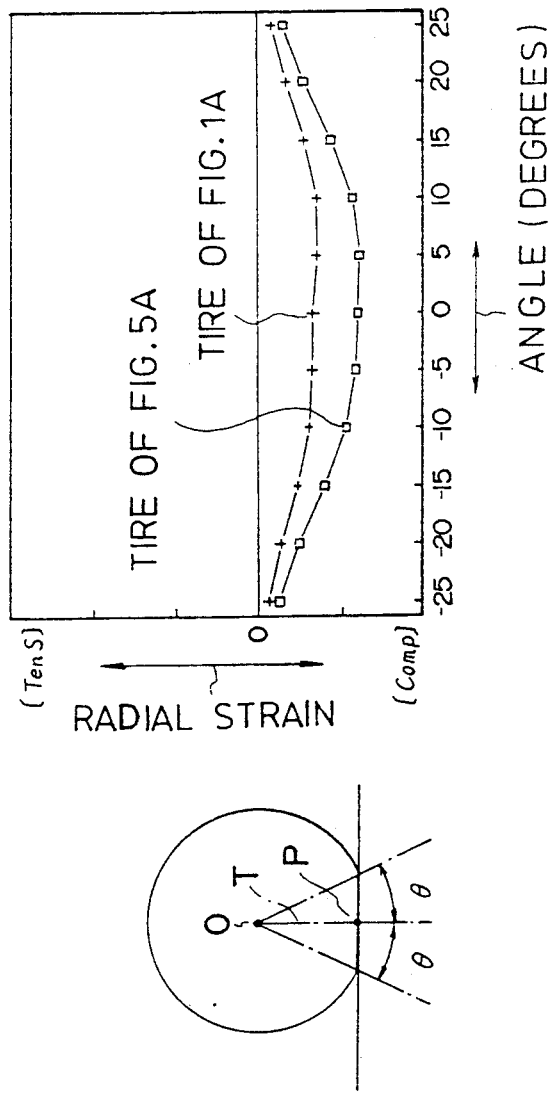
FIG. 3 is a graph illustrating results of a comparison of strains occurring in a radial direction of the tire in carcass turn-up portions.

FIG. 3 shows results of measurement of radial strains produced in the distal end portions of the turn-up portions 10A with the strain in a no-load state set as 0, for cases where a standard load was applied to tires provided with the bead portion structures shown in FIGS. 1a and 6a after inflation of the tires to a normal internal pressure.

It should be noted that, in FIG. 3, the angle plotted along the abscissa represents an angle $\theta$ between a perpendicular line T extending from an axis O of rotation of the tire to a ground contacting point P, and a line extending from the axis O to an end of the ground contacting area in a circumferential direction of the tire, in either a clockwise or counterclockwise direction of the tire, as viewed in FIG. 3.

EXPERIMENT 2

Results of measurement of a running distance until cracks occurred in the bead portion of a heavy-load tire (285/75R24.5; normal internal pressure, 7.75 kg/cm$^2$; standard load, 2,800 kg/cm$^2$) at an internal pressure of 7 kg/cm$^2$, gave a running distance of the tire of FIG. 1a according to the invention of 120 with the running distance of the conventional tire shown in FIG. 6a set as 100. Thus, the durability of the tire according to the invention was improved.

EXPERIMENT 3

Figure 4:
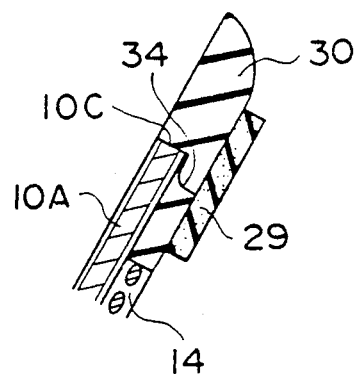
FIG. 4 is a schematic diagram illustrating a crack between the carcass and the hard rubber sheet.

Another experiment was conducted on three types of tire in which the dimension between the distal end portion of the turn-up portion 10A of the carcass and the hard rubber sheet 29 was set to ($\frac{1}{2}$)d, d, and 2d, respectively, with respect to the diameter d of the carcass ply cord 26. After running 100,000 km, the length of cracks occurring along the cords of the carcass 10 in the vicinity of the end face 10C of the carcass was less than 1 mm in the case of tires in which the case of the tire in which the dimension between the distal end portion of the turn-up portion 10A of the carcass and the hard rubber sheet 29 was set to ($\frac{1}{2}$)d, a large crack 34 of more than 1 mm in length occurred between the carcass 10 and the hard rubber sheet 29, as shown in FIG. 4.

EXPERIMENT 4

Still another experiment was conducted on three types of tires in which the dimension between the distal end portion of the turn-up portion 10A of the carcass and the hard rubber sheet 29 was set to 8d, 9d, and 10d, respectively, with respect to the diameter d of the carcass ply cord 26, as well as on a tire having a conventional structure without the hard rubber sheet. After running 100,000 km, the length of cracks occurring along the cords of the carcass 10 in the vicinity of the end face 10C of the carcass was less than 1 mm in the case of tires in which the aforementioned dimensions were 8d and 9d, being shorter than the approximately 1 mm value for the case of the tire having the conventional structure. Meanwhile, in the case of the tire in which the dimension between the distal end portion of the turn-up portion 10A of the carcass and the hard rubber sheet 29 was set to 10d, the length of cracks occurring along the cords of the carcass 10 in the vicinity of the end face 10C of the carcass was approximately 1 mm and was virtually the same as with the tire having the conventional structure.

EXPERIMENT 5

A further experiment was conducted on three types of tires in which the distance that the projecting portion of the hard rubber sheet 29 projected radially outwardly from a line parallel to the tire's axis and containing a radially outermost point of the end face 10C of the carcass was set to 0.11 H, 0.16 H, and 0.22 H, respectively, of the radial cross-sectional height H of the carcass layer. As for the state of cracks at the bead portion after running 100,000 km, in the case of the tires in which the aforementioned distance of the projecting portion of the hard rubber sheet 29 was 0.11 H and 0.16 H, respectively, cracks of less than 1 in length occurred along the carcass 10 in the vicinity of the end face 10C of the carcass. On the other hand, it was found that in the case of the tire in which the distance of the projecting portion of the hard rubber sheet 29 was 0.22 H, cracks of a greater length occurred from the radially outer end of the hard rubber sheet 29, possibly leading to the damage of the bead.

EXPERIMENT 6

A still further experiment was conducted on three types of tires in which the tensile strengths of the hard rubber sheets 29 were such that the moduli of elasticity were set to 60 kgf/cm$^2$, 70 kgf/cm$^2$, and 80 kgf/cm$^2$, respectively, at a 20% elongation. As for the state of cracks at the bead portion after running 100,000 km, in the case of the tires in which the moduli of elasticity were 60 kgf/cm$^2$ and 70 kgf/cm$^2$, respectively, cracks of less than 1 mm in length occurred along the carcass 10 in the vicinity of the end face 10C of the carcass. On the other hand, it was found that in the case of the tire in which the modulus of elasticity was 80 kgf/cm$^2$, cracks of a greater length occurred from a radially outer end of the hard rubber sheet 29, possibly leading to the damage of the bead.

EXPERIMENT 7

A further experiment was conducted on three types of tires in which the thickness of the hard rubber sheet 29 was set to ($\frac{1}{2}$)d, d, and 2d, respectively, with respect to the diameter d of the carcass ply cord 26, as well as on a tire having the conventional structure without the hard rubber sheet. After running 100,000 km, the length of cracks occurring along the cords of the carcass 10 in the vicinity of the end face 10C of the carcass was approximately 1 mm in the case of the tire having the thickness of ($\frac{1}{2}$)d, being virtually the same as for the tire having the conventional structure. Meanwhile, in the cases of the tires having thicknesses of d and 2d, respectively, the lengths of cracks occurring along the cords of the carcass 10 in the vicinity of the end face 10C of the carcass were less than 1 mm.

EXPERIMENT 8

A further experiment was conducted on three types of tire in which the tensile strengths of the soft rubber material 30 were such that the moduli of elasticity of the soft rubber materials were set respectively to $\frac{1}{2}$, $\frac{3}{4}$, and 1 times the modulus of elasticity of the hard rubber sheet 29 at a 20% elongation. After running 100,000 km, the length of cracks occurring along the cords of the carcass 10 in the vicinity of the end face 10C of the carcass was less than 1 mm in the case of the tire with the modulus of elasticity of the soft rubber material 30 set to $\frac{1}{2}$ of the modulus of elasticity of the hard rubber sheet 29 at a 20% elongation, while in the case of the tires with the moduli of elasticity of the soft rubber materials 30 set respectively to $\frac{3}{4}$ and 1 times the modulus of elasticity of the hard rubber sheet 29 at a 20% elongation the lengths of cracks were less than 1 mm. However, large cracks 34 having a length of more than 1 mm occurred, possibly leading to breakage of the bead.

It is apparent from the results of these experiments that the bead portion structure according to the invention gives improved tire performance.

By virtue of the above-described arrangement, the pneumatic radial tire according to the present invention offers an outstanding advantage in that it is possible to reduce the amounts of heat and strain generated in the vicinity of distal end portions of a carcass and improve the durability of bead portions without the occurrence of additional cracks therein.

What is claimed is:

1. A pneumatic radial tire having at least one carcass ply which is formed of carcass ply cords and carcass ply coating rubber covering longitudinal peripheral surfaces thereof, distal end portions of which are respectively folded back around bead cores from the inside of said tire to the outside thereof to constitute turn-up portions, said pneuymatic radial tire being inflated with air, comprising:

a hard rubber sheet including an opposing portion which opposes an axially outer side of said turn-up portion, and a projecting portion which projects radially outwardly of an end face of said turn-up portion in a direction away from said bead core, an axial distance between said turn-up portion and said hard rubber sheet being not less than a diameter of said carcass ply cord and not more than 10 times said diameter;

a soft rubber material which is interposed between said turn-up portion and said hard rubber sheet and is softer than said hard rubber sheet, wherein an axially inner side of said hard rubber sheet directly contacts an axially outer side of said soft rubber material; and surface-layer rubber provided on the entire axially outer side of said hard rubber sheet.

2. A pneumatic radial tire according to claim 1, wherein the distance that said projecting portion of said hard rubber sheet projects radially outwardly of a line parallel to the tire's axis of rotation and containing a radially outermost point of the end face of said carcass ply is set to be not more than 0.16 times the radial cross-sectional height of said carcass ply.

3. A pneumatic radial tire according to claim 1, wherein said hard rubber sheet has a modulus of elasticity which does not exceed 70 kgf/cm$^2$ at a 20% elongation.

4. A pneumatic radial tire according to claim 1, wherein said hard rubber sheet has a thickness greater than the thickness of said carcass ply cord.

5. A pneumatic radial tire according to claim 1, wherein the modulus of elasticity of said soft rubber material at a 20% elongation is not more than three-fourths of the modulus of elasticity of said hard rubber sheet at a 20% elongation.

6. A pneumatic radial tire according to claim 1, wherein said soft rubber material covers said end face of said turn-up portion.

7. A pneumatic radial tire having at least one carcass ply which is formed of carcass ply cords and carcass ply coating rubber covering longitudinal peripheral surfaces thereof, distal end portions of which are repsectively folded back around bead cores from the inside of said tire to the outside thereof to constitute turn-up portions, said pneumatic radial tire being inflated with air, comprising:

a stiffner disposed in such a manner as to extend from an inside portion of said turn-up portion of said carcass ply radially outwardly thereof;

a hard rubber sheet including an opposing portion which opposes an axially outer side of said turn-up portion and a projection portion which projects radially outwardly of an end face of said turn-up portion in a direction away from said bead core, an axial distance between said turn-up portion and said hard rubber sheet being not less than a diameter of said carcass ply cord and not more than 10 times said diameter;

a soft rubber material which is interposed between said turn-up portion and said hard rubber sheet and which is softer than said hard rubber sheet, wherein an axially inner side of said hard rubber sheet directly contacts an axially outer side of said soft rubber material; and surface-layer rubber disposed on the entire axially outer side of said hard rubber sheet.

8. A pneumatic radial tire according to claim 7, wherein the distance that said projecting portion of said hard rubber sheet projects above a line parallel to the tire's axis of rotation and containing a radially outermost point of the end face of said carcass ply is set to be not more than 0.16 times a radial cross.sectional height of said carcass ply.

9. A pneumatic radial tire according to claim 7, wherein said hard rubber sheet has a modulus of elasticity which does not exceed 70 kgf/cm$^2$ at a 20% elongation.

10. A pneumatic radial tire according to claim 7, wherein said hard rubber sheet has a thickness not less than the thickness of said carcass ply cord.

11. A pneumatic radial tire according to claim 7, wherein the modulus of elasticity of said soft rubber material at a 20% elongation is not more than three-fourths of the modulus of elasticity of said hard rubber sheet at a 20% elongation.

12. A pneumatic radial tire according to claim 7, wherein said soft rubber material covers said end face of said turn. up portion and is connected to said stiffener.

13. A pneumatic radial tire according to claim 12, further comprising a strip of rubberized steel cords disposed on the outer side of said turn-up portion.

14. A pneumatic radial tire according to claim 7, further comprising a strip of rubberized textile cords disposed on the outer side of said turn-up portion.

15. A pneumatic radial tire according to claim 13, comprising at least one strip of rubberized textile cords disposed on the outer side of said strip of rubberized steel cords.

* * * * *